(12) United States Patent
Egawa et al.

(10) Patent No.: US 7,597,386 B2
(45) Date of Patent: Oct. 6, 2009

(54) FLOOR PANEL IN VEHICLE, HAVING POSITIONING HOLE FORMED IN JOINT BETWEEN BEADS

(75) Inventors: Yasuhisa Egawa, Sakura (JP); Shigeto Yasuhara, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/042,024

(22) Filed: Mar. 4, 2008

(65) Prior Publication Data
US 2008/0258502 A1 Oct. 23, 2008

(30) Foreign Application Priority Data
Apr. 20, 2007 (JP) .............................. 2007-111554

(51) Int. Cl.
*B62D 25/20* (2006.01)
(52) U.S. Cl. .................................. 296/193.07; 296/204
(58) Field of Classification Search ............ 296/193.07, 296/204
See application file for complete search history.

(56) References Cited

U.S. PATENT DOCUMENTS 4,402,545 A 9/1983 Utsunomiya et al.

2005/0285432 A1 * 12/2005 Sugihara et al. ........ 296/193.07
2006/0232105 A1 * 10/2006 Egawa et al. ........... 296/193.07

FOREIGN PATENT DOCUMENTS

| JP | 57-29483 | 2/1982 |
| JP | 58-214417 | 12/1983 |
| JP | 03-153480 | 7/1991 |
| JP | 09-240288 | 9/1997 |
| JP | 2005-059817 | 3/2005 |
| JP | 2006-298076 | 11/2006 |

* cited by examiner

*Primary Examiner*—Lori L Lyjak
(74) *Attorney, Agent, or Firm*—Rankin, Hill & Clark LLP

(57) ABSTRACT

In a floor panel in a vehicle, a plurality of beads are arranged in parallel on the floor panel; a joint part for connecting adjacent two of the beads is provided so as to form a coplanar surface over the two beads; a positioning hole, which is used for positioning the floor panel during assembly, is provided in the joint part; and a burr, which protrudes toward the inside of the beads, is formed at the inner periphery of the positioning hole. Preferably, the length of the joint part along the length of the two beads is determined so as to secure the width length of each of the two beads on both sides of the positioning hole. Typically, a plurality of the positioning holes is provided so as to be dispersed in the front-to-back direction of the vehicle.

6 Claims, 7 Drawing Sheets

US 7,597,386 B2

FLOOR PANEL IN VEHICLE, HAVING POSITIONING HOLE FORMED IN JOINT BETWEEN BEADS

BACKGROUND OF THE INVENTION

1. Field of the Invention

The present invention relates to a floor panel in a vehicle.

Priority is claimed on Japanese Patent Application No. 2007-111554, filed Apr. 20, 2007, the contents of which are incorporated herein by reference.

2. Description of the Related Art

The floor of a vehicle may be formed by connecting a plurality of floor panels. When assembling a floor having such a structure, first, it is necessary to position each floor panel by using positioning jigs, so as to appropriately determine the relative position between the floor panels.

In a known method for positioning the floor panels, a positioning hole is formed in each floor panel in advance, and a positioning jig is inserted into the positioning hole.

On the other hand, in a floor panel developed for improving the rigidity thereof, a large number of protruding or recessed beads are arranged over the entire surface thereof (see, for example, Japanese Unexamined Patent Application, First Publication No. 2006-298076).

If providing a positioning hole in such a floor panel having the beads, the rigidity of the floor panel may be degraded depending on the position or size of the positioning hole.

SUMMARY OF THE INVENTION

In light of the above circumstances, an object of the present invention is to provide a floor panel in a vehicle, which can be easily positioned without degrading the rigidity.

Therefore, the present invention provides a floor panel (e.g., a floor panel 3 or 4 in an embodiment explained later) in a vehicle, wherein:

a plurality of beads (e.g., beads 50 in the embodiment) are arranged in parallel on the floor panel;

a joint part (e.g., a joint part 56 or 61 in the embodiment) for connecting adjacent two of the beads is provided so as to form a coplanar surface over the two beads;

a positioning hole (e.g., a positioning hole 52A or 52B in the embodiment), which is used for positioning the floor panel during assembly, is provided in the joint part; and a burr (e.g., a burr 57 or 63 in the embodiment), which protrudes toward the inside of the beads, is formed at the inner periphery of the positioning hole.

In accordance with the above structure, when assembling the relevant floor, the floor panel can be easily placed at an appropriate position by inserting a positioning jig into the positioning hole of the floor panel.

In addition, as the positioning hole is provided in the joint part for connecting adjacent two of the beads (so as to form a coplanar surface over the two beads), and the burr is formed at the inner periphery of the positioning hole, the positioning hole can be provided without degrading the rigidity of the floor panel.

Preferably, the length of the joint part along the length of the two beads is determined so as to secure the width length of each of the two beads on both sides of the positioning hole. Accordingly, the two beads on both sides of the positioning hole can be connected to each other so as to form a U-turn path from each side, while keeping the width of the bead. Therefore, it is possible to prevent the rigidity of the floor panel from degrading due to the provision of the positioning hole.

In a typical example, a plurality of the positioning holes is provided so as to be dispersed in the front-to-back direction of the vehicle. In this case, the floor panel can be positioned at a plurality of positions in the front-to-back direction. Therefore, a well-balanced and accurate positioning of the floor panel can be performed.

In a preferable example, a surface part (e.g., a recessed surface 62 in the embodiment) for increasing the number of edges is provided in the joint part (e.g., the joint part 61 in the embodiment); and the positioning hole (e.g., the positioning hole 52B in the embodiment) is formed in the surface part. In this case, the number of edges can be further increased by providing the recessed surface and the burr, so that there is almost no decrease in the surface rigidity at the joint part, thereby preventing the rigidity of the floor panel from degrading due to the provision of the positioning hole.

DETAILED DESCRIPTION OF THE INVENTION

Hereinafter, an embodiment of the present invention will be described with reference to the appended FIGS. 1 to 12. The upper-to-lower direction, the front-to-back direction, and the left-to-right direction in the following explanation respectively coincide with the upper-to-lower direction, the front-to-back direction, and the left-to-right direction of the relevant vehicle.

Figure 1:
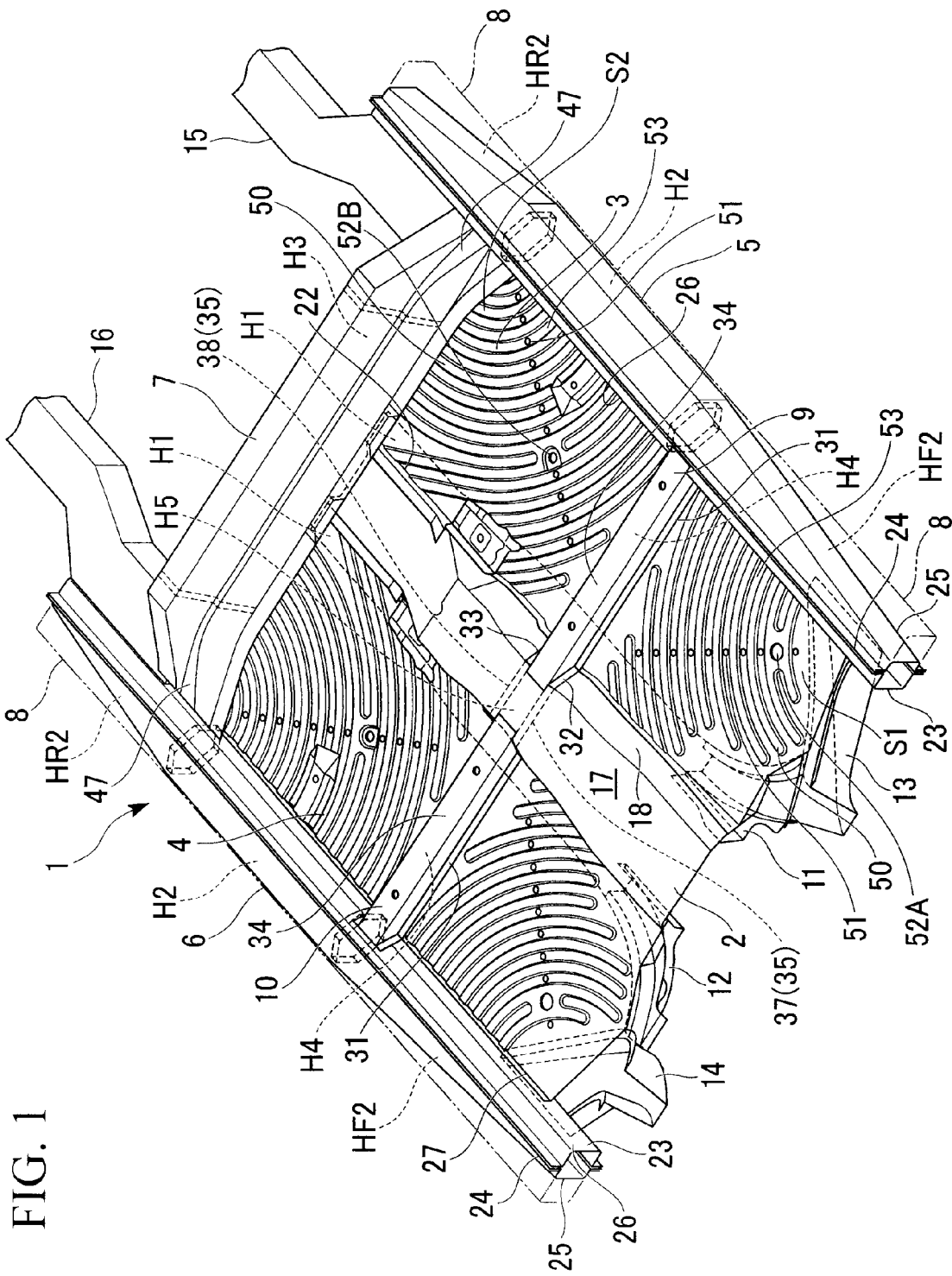
FIG. 1 is a perspective view showing the appearance of a floor of a vehicle body, as an embodiment of the present invention.
Figure 2:
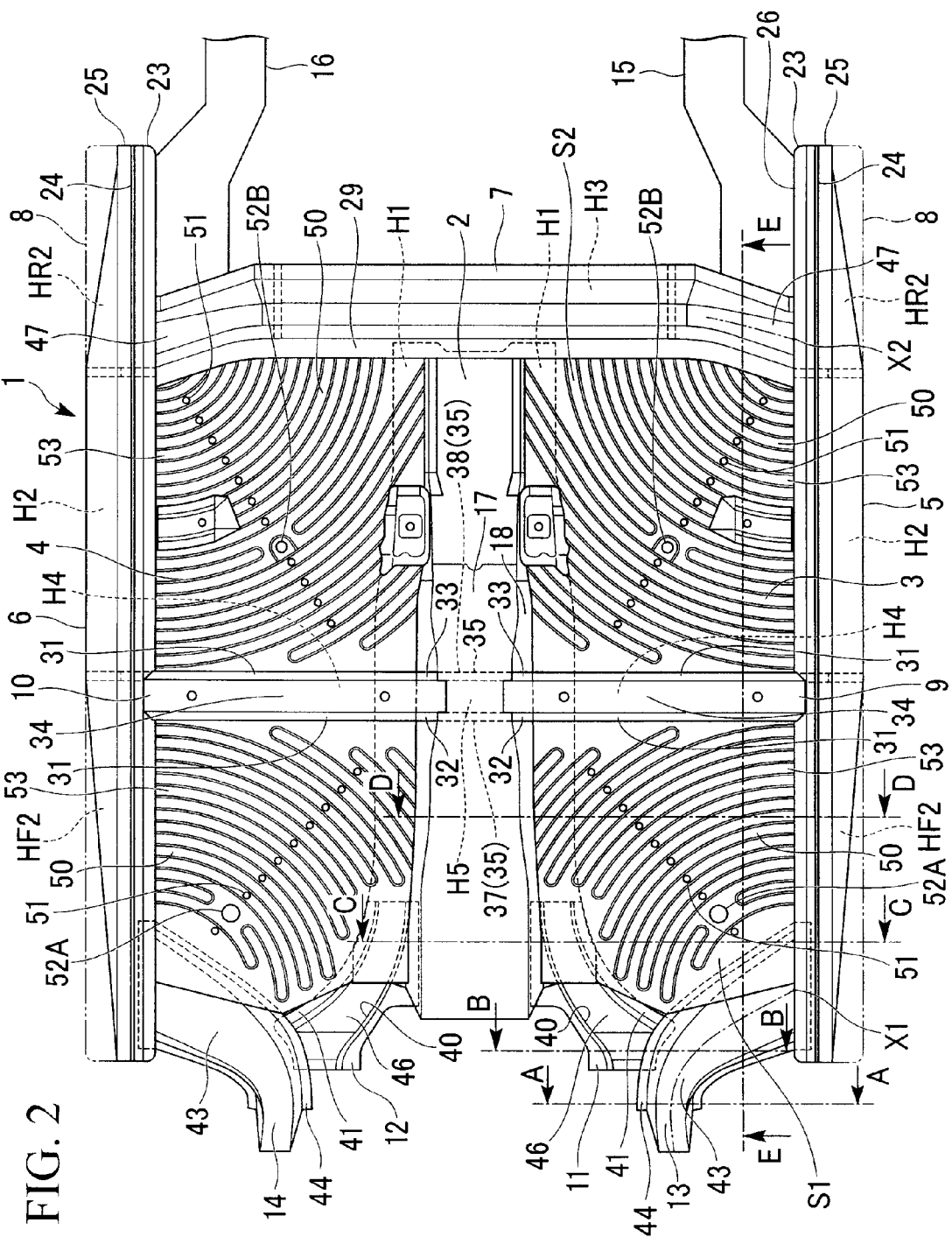
FIG. 2 is a plan view of the floor of the vehicle body in the embodiment.

FIG. 1 is a perspective view showing the appearance of a floor 1 of a vehicle body, as an embodiment of the present invention. FIG. 2 is a plan view of the floor 1 of the vehicle body.

As shown in FIGS. 1 and 2, in the floor 1 of the relevant vehicle, a floor tunnel frame 2 is formed at the center in the width direction of the vehicle, and it extends in the front-to-back direction of the vehicle body. Reference numerals 3 and 4 indicate floor panels on the left and right sides of the floor tunnel frame 2, and the inner side edges of the floor panels 3 and 4 are joined to the corresponding side edges of the floor tunnel frame 2. To the outer side edges of the floor panels 3 and 4, a left side sill 5 and a right side sill 6 are respectively attached. The side sills 5 and 6 are frame members of the vehicle body, which extend in the front-to-back direction of the vehicle body.

The rear parts of the side sills 5 and 6 are coupled to each other via a middle cross member 7, which is also a frame member of the vehicle body. The front edge of the middle cross member 7 is joined to the rear edges of the floor panels 3 and 4. In addition, the substantial center of the floor tunnel frame 2 in the front-to-back direction is coupled with the side sills 5 and 6 by means of front cross members 9 and 10 on the left and right sides of the floor tunnel frame 2.

Reference numerals 11 and 12 indicate extensions on the left and right sides of the floor tunnel frame 2, and an end of each extension is connected to the corresponding side wall of a front end part in the floor tunnel frame 2. Reference numerals 13 and 14 indicate outriggers. An end of the outrigger 13 is connected to the front end part of the left side sill 5, and an end of the outrigger 14 is connected to the front end part of the right side sill 6. The left extension 11 and the right extension 12 are respectively coupled to the inner side walls of the outriggers 13 and 14.

The left and right ends 47 of the middle cross member 7 each bend obliquely forward. Reference numeral 15 and 16 indicate rear side frames on the left and right sides. A front end part of the rear side frame 15 on the left side is joined to the left end 47 of the middle cross member 7 and the inner wall of a rear part of the left side sill 5. Similarly, a front end part of the rear side frame 16 on the right side is joined to the right end 47 of the middle cross member 7 and the inner wall of a rear part of the right side sill 6. The floor 1 is mainly formed by the floor panels 3 and 4, and the floor tunnel frame 2.

Figure 3:
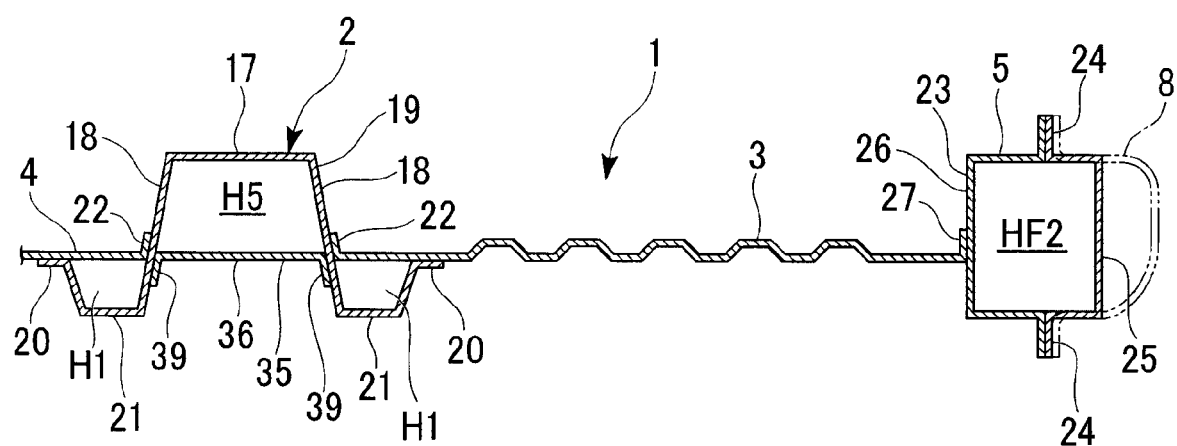
FIG. 3 is a sectional view along line D-D in FIG. 2.

FIG. 3 is a sectional view along, line D-D in FIG. 2. As shown in FIG. 3, the floor tunnel frame 2 is formed by a tunnel main body 19 and wing parts 21. The tunnel main body 19 is formed by an upper wall 17 and inclined side walls 18, so as to protrude upward from the position of the floor panels 3 and 4. Each wing part 21 (i) extends downward from the corresponding side edge of the tunnel main body 19, so as to be lower than the position of the floor panels 3 and 4, (ii) extends outward in the horizontal direction, and (iii) further extends upward so as to be welded to the corresponding lower surface of the floor panels 3 and 4 via a flange part 20.

At the inner side edges of the floor panels 3 and 4, flange parts 22 are formed upward, and they are welded to the corresponding side walls 18 of the tunnel main body 19 in the floor tunnel frame 2. Accordingly, closed-section structures H1, which extend in the front-to-back direction of the vehicle body, are formed by the floor panels 3 and 4 and the wing parts 21, wherein the structures H1 are provided below the side walls of the floor tunnel frame 2 and the floor panels 3 and 4.

The side sills 5 and 6 each have (i) a side sill inner part 23 protruding toward the interior of the vehicle, (ii) a reinforcement 25 joined to the side sill inner part 23 by means of upper and lower joint flange parts 24 so as to form a closed-section structure, and (iii) a side sill outer part 8 which is used for further forming a closed-section structure on the outside of the reinforcement 25, and is connected to the joint flange parts 24.

The side sill inner part 23 has the same sectional shape over almost the entire length. In contrast, as shown in FIGS. 1 and 2, the reinforcements 25 have oblique closed-section form parts HF2 and HR2, in which the protruding length toward the outside (along the width of the vehicle) gradually increases from the front or rear end to a center part along the front-to-back direction. Accordingly, maximum protrusion closed-section parts H2 having the maximum outward protruding length from the relevant reinforcement 25 are provided over a specific length in the front-to-back direction of the vehicle body. The maximum protrusion closed-section parts H2 are positioned between the middle cross member 7 and the front cross members 9 and 10. To the inner side walls 26 of both side sill inner parts 23, flange parts 27 are joined, which are formed upward on the outer edges of the floor panels 3 and 4.

Figure 4:
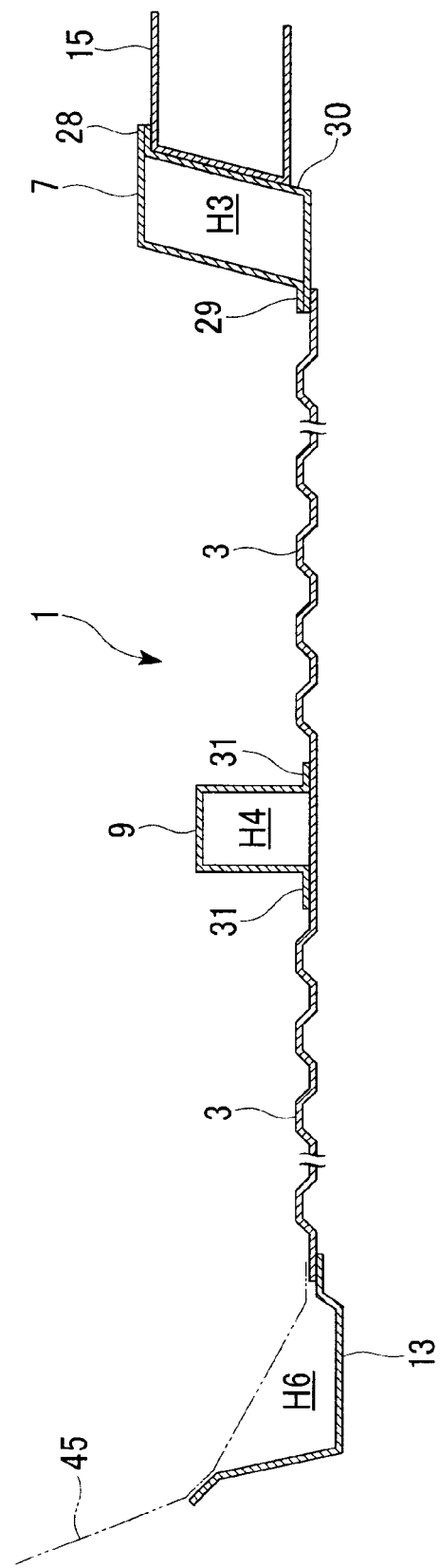
FIG. 4 is a sectional view along line E-E in FIG. 2.

FIG. 4 is a sectional view along line E-E in FIG. 2. As shown in FIG. 4, in the middle cross member 7, two members, each having an L-shaped section, face each other, and a rear upper-edge flange part 28 and a front lower-edge flange part 29 are each subjected to welding, so as to form a closed-section structure H3 having a substantially rectangular form and functioning as a frame part of the vehicle body. The front lower-edge flange part 29 is welded to the rear edge of the floor panels 3 and 4. To a rear wall 30 of the middle cross member 7, the front ends of the rear side frames 15 and 16 are joined.

The front cross members 9 and 10 each have a hat-shaped section which is open downward. In addition, front and rear flange parts 31 of the front cross member 9 are joined to the upper surface of the floor panel 3, and similarly, front and rear flange parts 31 of the front cross members 10 are also joined to the upper surface of the floor panel 4, thereby forming closed-section structures H4 on the upper surfaces of the floor panels 3 and 4. The closed-section structure H4 function as frame parts (along the width of the vehicle) of the vehicle body.

The outer side ends of the front cross members 9 and 10 are each joined to the inner side wall 26 and a part of the upper wall of the corresponding side sill inner part 23. As shown in FIGS. 1 and 2, in each inner end part of the front cross members 9 and 10, a front flange part 32 and a rear flange part 33 are joined to the corresponding side wall 18 of the floor tunnel frame 2. In addition, an end edge of each upper wall 34 of the front cross members 9 and 10 is joined to the upper wall 17 of the floor tunnel frame 2.

As shown in FIG. 3, on the back side of the tunnel main body 19 in the floor tunnel frame 2, a joint frame 35 is fastened at a position for connecting the front cross members 9 and 10 on the left and right sides. The joint frame 35 has a hat-shaped section (along the front-to-back direction of the vehicle body) which is open upward, that is, toward the opposite side in comparison with the front cross members 9 and 10. The height of the lower wall 36 of the joint frame 35 coincides with that of the floor panels 3 and 4. A front flange 37 and a rear flange 38 of the joint frame 35 (see FIGS. 1 and 2) are joined to the back side of the tunnel main body 19, and side edges 39 of the lower wall 36 are joined to the corresponding side walls of the wing parts 21 in the floor tunnel frame 2.

Accordingly, a closed-section structure H5 is formed between the joint frame 35 and the floor tunnel frame 2, and is coupled with the closed-section structures H4, which are formed (i) between the front cross member 9 and the floor panel 3 and (ii) between the front cross member 10 and the floor panel 4, thereby forming a frame body of the vehicle body which is a substantially single body for coupling the side sills to each other.

Figure 5:
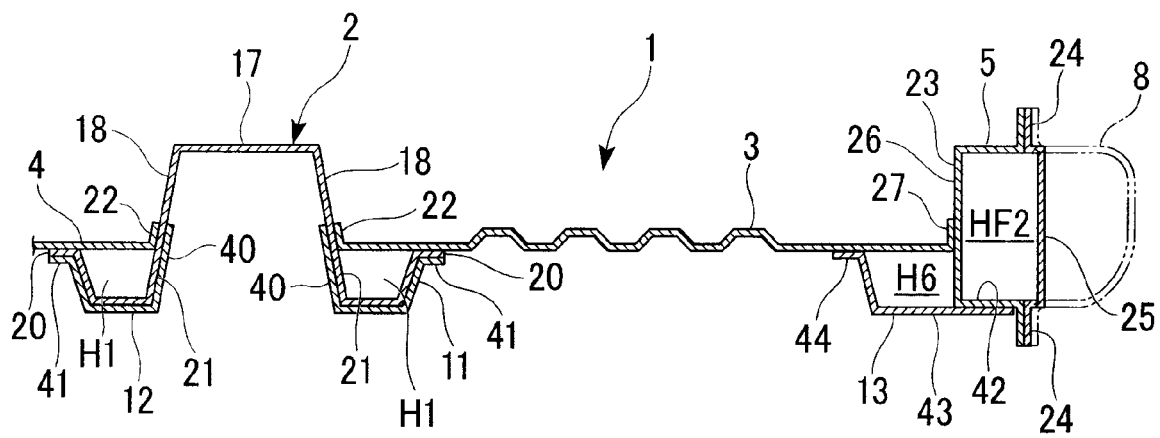
FIG. 5 is a sectional view along line C-C in FIG. 2.

FIG. 5 is a sectional view along line C-C in FIG. 2. As shown in FIG. 5, in each of the extensions 11 and 12 on the left and right sides, one end has a form which is open upward so as to totally cover the corresponding wing part 21 (of the floor tunnel frame 2) from the lower side thereof. In each inner side wall 40 of the extensions 11 and 12, a part corresponding to the relevant flange part 22 of the floor panels 3 and 4 is joined to the back face of the corresponding side wall 18 in the tunnel main body 19 of the floor tunnel frame 2. An outer flange part 41 in the one end of each of the extensions 11 and 12 is superimposed on the flange part 20 of the corresponding wing part 21.

On the other hand, one ends of the outriggers 13 and 14 are respectively joined to the floor panels 3 and 4 by means of (i) a lower wall 43, (ii) a part which rises up from the lower wall 43 toward the lower surface of the corresponding floor panel, and (iii) a flange part 44 in each outrigger, thereby forming closed-section structures H6 together with the pair of the side sill 5 and the floor panel 3, and the pair of the side sill 6 and the floor panel 4.

Figure 6:
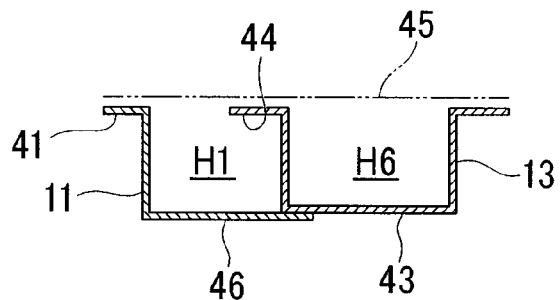
FIG. 6 is a sectional view along line B-B in FIG. 2.
Figure 7:
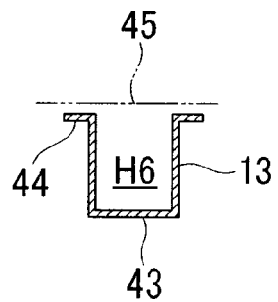
FIG. 7 is a sectional view along line A-A in FIG. 2.

The extensions 11 and 12 and the outriggers 13 and 14 having the above-described structure have a form which gradually rises up toward the front of the vehicle along the back face of a dashboard lower panel 45 (see the alternate long and two short dashes line in FIG. 4) which is attached to the upper surfaces of the front edges of the floor panels 3 and 4. FIG. 6 is a sectional view along line B-B in FIG. 2, and FIG. 7 is a sectional view along line A-A in FIG. 2. As shown in FIGS. 6 and 7, the front side of each of the outriggers 13 and 14 has a hat-shaped section, and to the lower wall 43 thereof, the lower wall 46 of the corresponding extension (11 or 12) is joined, that is, both lower walls are joined to each other. In addition, the rear end of a front side frame (not shown) of the vehicle is connected to the front end of the outrigger 13. In each of FIGS. 6 and 7, the alternate long and two short dashes line indicates the dashboard lower panel 45 which forms the closed-section structures H6 and H1 together with the outriggers 13 and 14, and the extensions 1 and 12.

As shown in FIGS. 1 and 2, a number of beads 50 having a rippled form (as water rings) are regularly provided on the almost entire surfaces of the floor panels 3 and 4, and a number of liquid discharge holes 51 and a plurality of positioning holes 52A and 52B are also provided. The floor panels 3 and 4 have a symmetrical form between the left and right sides of the floor tunnel frame 2, and the beads 50, the liquid-discharge holes 51, and the positioning holes 52A and 52B also have a symmetrical arrangement on the floor panels 3 and 4 of the left and right sides. Below, the left floor panel 3 will be explained in detail.

In the sectional views of FIGS. 3 to 5, the shape of the beads 50, which is actually complex, is simplified for convenience of explanations.

In the floor panel 3, there is a difference in the arrangement pattern of the beads 50 between the front side and the rear side of the front cross member 9.

More specifically, in a substantially rectangular area S1 (called the "front area") on the front side of the front cross member 9, a plurality of the beads 50, each having an arc form, are coaxially arranged at regular intervals with respect to the center point which is the intersection X1 between the center of the section at one end of the outrigger 13 and the inner side wall 26 of the side sill inner part 23. In other words, in the front area S1 of the floor panel 3, the plurality of beads 50 are arranged in parallel. One ends of the beads 50 extend so as to be substantially perpendicular to the side sill inner part 23, and a part of the other ends of the beads 50 extend so as to be substantially perpendicular to the width direction of the above-described front side frame.

On the other hand, in another substantially rectangular area S2 (called the "rear area") on the back side of the front cross member 9, a plurality of the beads 50, each having an arc form, are also coaxially arranged at regular intervals with respect to the center point which is the intersection X2 between the center of the section at an end 47 of the middle cross member 7 and the inner side wall 26 of the side sill inner part 23. In other words, in the rear area S2 of the floor panel 3, the plurality of beads 50 are arranged in parallel. One ends of the beads 50 extend so as to be substantially perpendicular to the side sill inner part 23, and a part of the other ends of the beads 50 extend so as to be substantially perpendicular to the middle cross member 7.

Each of the beads 50 has a trapezoidal form by means of press working, so as to protrude higher than the general surface, and form a valley 53 between any adjacent beads 50.

Such a large number of the beads 50 improve the rigidity of the floor panels 3 and 4. The height of the beads 50 can be appropriately determined in consideration of a balance between the rigidity required for the floor panels 3 and 4 and the space in the interior of the vehicle.

Additionally, in the front area S1, the liquid discharge holes 51 and the positioning hole 52A are aligned on a line which is perpendicular to the beads 50 and is close to a diagonal for connecting the joint between the outrigger 13 and the side sill inner part 23 to the joint between the floor tunnel frame 2 and the front cross member 9. On the other hand, in the rear area S2, the liquid discharge holes 51 and the positioning hole 52B are aligned on a line which is perpendicular to the beads 50 and is close to a diagonal for connecting the joint between the floor tunnel frame 2 and the front cross member 9 to the joint between the middle cross member 7 and the side sill inner part 23.

Each of the liquid discharge holes 51 is provided at the center of each valley 53 formed between any adjacent beads 50.

After the vehicle body is assembled, it is undercoated by means of electrodeposition. In the relevant coating process, the vehicle body is immersed in an electrodeposition liquid, and is extracted from the liquid after the electrodeposition is completed. The vehicle body is then supported so as to have a horizontal position, and in that state, the electrodeposition liquid attached to the vehicle body is removed by means of gravity drop. In this process, the liquid discharge holes 51 accelerate the discharge of the electrodeposition liquid attached to the floor panel 3.

As described above, in the front area S1 or the rear area S2, the liquid discharge holes 51 are provided on a line (which is a diagonal or close thereto) perpendicular to the beads 50. Therefore, when the electrodeposition liquid, which remains in each valley 53 between the relevant adjacent beads 50 in the floor panel 3, is drawn into the liquid discharge holes 51, the travel distance of the electrodeposition liquid to the liquid discharge holes 51 is almost the same between the left and right sides of the liquid discharge holes 51. Accordingly, it is possible to shorten the time necessary for discharging the electrodeposition liquid, thereby improving productivity.

The positioning hole 52A in the front area S1 of the floor panel 3 is provided at a joint part of two beads 50 which are close to the outrigger 13.

Figure 8:
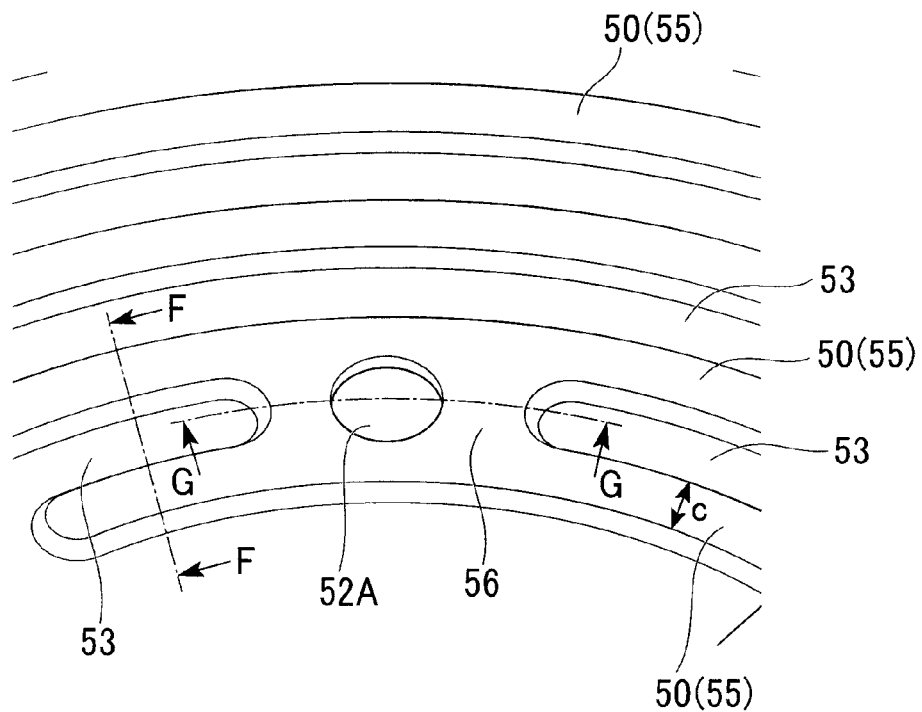
FIG. 8 is an enlarged perspective view showing a part of a floor panel, in the vicinity of one of positioning holes provided in the floor panel.
Figure 9:
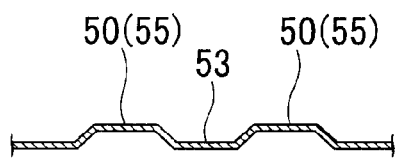
FIG. 9 is a sectional view along line F-F in FIG. 8.
Figure 10:
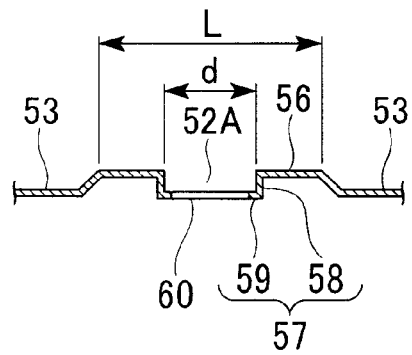
FIG. 10 is a sectional view along line G-G in FIG. 8.

FIG. 8 is an enlarged perspective view showing a part of the floor panel 3, in the vicinity of the positioning hole 52A. FIG. 9 is a sectional view along line F-F in FIG. 8, and FIG. 10 is a sectional view along line G-G in FIG. 8.

As shown in FIG. 8, at the position where the positioning hole 52A is provided, the heads 55 of the relevant two adjacent beads 50 are made coplanar so as to form a joint part 56. Accordingly, the valley 53 formed between the above two beads 50 is divided into two parts by the joint part 56. The positioning hole 52A is formed at the center of the joint part 56.

In the present embodiment, with a given distance L between the divided valley parts, a diameter d of the positioning hole 52A, and a width c of the head 55 of each relevant bead 50 (see FIGS. 8 and 10), the distance L is defined as the following formula (1):

$$L=d+2c \quad (1)$$

That is, the length L of the joint part 56 along the longitudinal direction of the relevant bead 50 is set to a value obtained by providing the width c of the bead 50 on both sides of the positioning hole 52A. Accordingly, the two beads 50 on both sides of the positioning hole 52A can be connected to each other so as to form a U-turn path from each side, while keeping the width c of the bead 50. Therefore, it is possible to prevent the rigidity of the floor panel 3 from degrading due to the provision of the positioning hole 52A.

As shown in FIG. 10, a burr 57 (by burring), which protrudes toward the inside of the relevant beads 50, is formed at the inner-periphery of the positioning hole 52A. The burr 57 consists of a downward-extending part 58 which extends perpendicularly downward from the joint part 56, and a brim part 59 which protrudes horizontally inward from the lower end of the downward-extending part 58. Reference numeral 60 indicates a hole formed on the inside of the brim part 59, and a positioning jig is inserted into the hole 60 when the floor 1 is assembled. As the burr 57 is formed at the positioning hole 52A, the number of edges at the positioning hole 52A increases, so that there is almost no decrease in the surface rigidity at the joint part 56. Therefore, it is possible to prevent the rigidity of the floor panel 3 from degrading due to the provision of the positioning hole 52A.

On the other hand, the positioning hole 52B in the rear area S2 of the floor panel 3 is provided at a position at the substantial center of the rear area S2, where two adjacent beads 50 are joined to each other.

Figure 11:
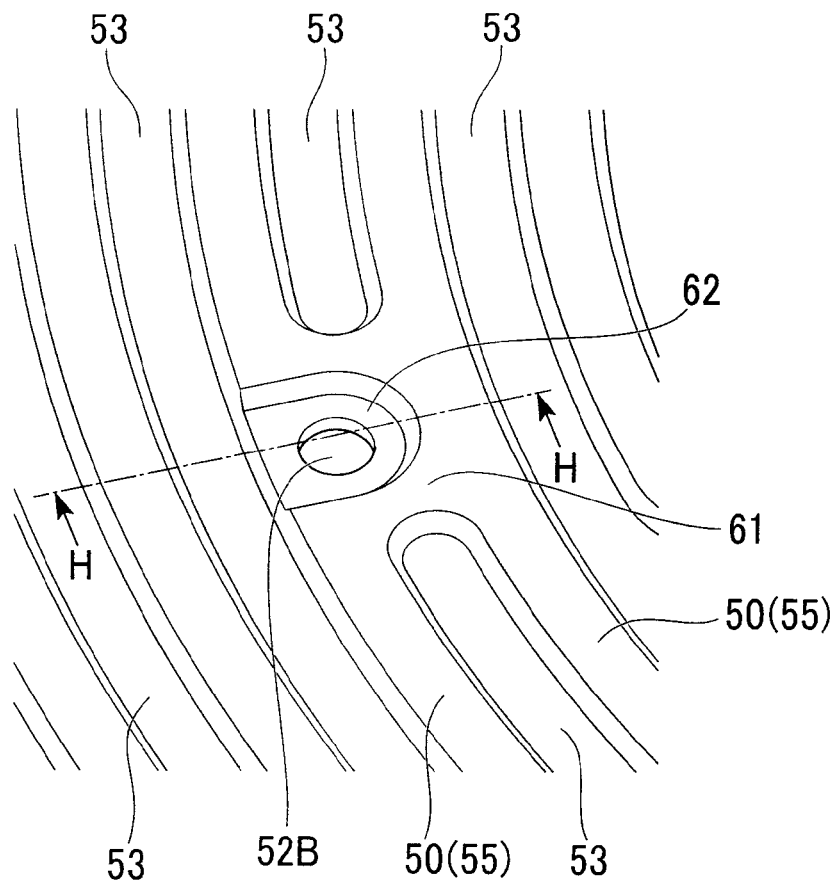
FIG. 11 is an enlarged perspective view showing a part of the floor panel, in the vicinity of the other positioning hole.
Figure 12:
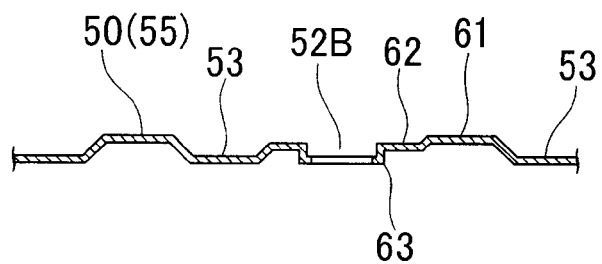
FIG. 12 is a sectional view along line H-H in FIG. 11.

FIG. 11 is an enlarged perspective view showing a part of the floor panel 3, in the vicinity of the positioning hole 52B. FIG. 12 is a sectional view along line H-H in FIG. 11.

As shown in FIG. 11, at the position where the positioning hole 52B is provided, the heads 55 of the relevant two adjacent beads 50 are made coplanar so as to form a joint part 61. Accordingly, the valley 53 formed between the above two beads 50 is divided into two parts by the joint part 61. In the joint part 61, a recessed surface 62 is formed on one side of the two beads 50, in a manner such that it protrudes into the inside of the relevant beads 50 and joins the valley 53 adjacent thereto. The positioning hole 52B is provided at the substantial center of the recessed surface 62.

As shown in FIG. 12, similar to the positioning hole 52A, a burr 63 is formed at the inner periphery of the positioning hole 52B. With respect to the positioning hole 52B, the number of edges is further increased by providing the recessed surface 62 and the burr 63, so that there is almost no decrease in the surface rigidity at the joint part 61, thereby preventing the rigidity of the floor panel 3 from degrading due to the provision of the positioning hole 52B.

As described above, the positioning holes 52A and 52B are formed in the floor panels 3 and 4. Therefore, when assembling the floor 1, positioning jigs are inserted into the positioning holes 52A and 52B of the floor panels 3 and 4, so as to easily position the floor panels 3 and 4 to appropriate places, and simultaneously to provide an appropriate relative distance between the floor panels 3 and 4.

The appropriately-positioned floor panels 3 and 4 are used as a reference for appropriately arranging the floor tunnel frame 2 which is positioned using another positioning jig, and the floor panels 3 and 4 and the floor tunnel frame 2 are welded to each other, thereby assembling the floor 1. Accordingly, the floor tunnel frame 2 and the floor panels 3 and 4 can be joined to each other while providing and keeping an appropriate relative positional relationship therebetween. After that, the other relevant members are welded in order to the floor 1.

Additionally, in the floor panels 3 and 4, as the positioning holes 52A and 52B are dispersed in the front-to-back direction of the vehicle body, each of the floor panels 3 and 4 can be positioned at two positions in the front-to-back direction. Therefore, a well-balanced and accurate positioning of the floor panels 3 and 4 can be performed.

Other Embodiments

While preferred embodiments of the invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, in the above embodiment, each bead has a trapezoidal sectional shape, however, it may have a semicircular or triangular sectional shape.

What is claimed is:

1. A floor panel in a vehicle, wherein:
   a plurality of beads are arranged in parallel on the floor panel;
   a joint part for connecting two adjacent beads is provided so as to form a coplanar surface between the two beads;
   a positioning hole, which is used for positioning the floor panel during assembly, is provided in the joint part; and
   a burr, which protrudes toward the inside of the beads, is formed at the inner periphery of the positioning hole.

2. The floor panel in accordance with claim 1, wherein the length of the joint part along the length of the two beads is determined so as to secure the width length of each of the two beads on both sides of the positioning hole.

3. The floor panel in accordance with claim 1, wherein a plurality of the positioning holes is provided so as to be dispersed in the front-to-back direction of the vehicle.

4. The floor panel in accordance with claim 2, wherein a plurality of the positioning holes is provided so as to be dispersed in the front-to-back direction of the vehicle.

5. The floor panel in accordance with claim 1, wherein:
   a surface part for increasing the number of edges is provided in the joint part; and
   the positioning hole is formed in the surface part.

6. The floor panel in accordance with claim 1,
   wherein a valley formed between said two adjacent beads is divided into two parts by the joint part, and
   wherein with a given distance L between the divided two parts of the valley, a diameter d of the positioning hole, and a width c of a head of each bead, the distance L is defined as:

$L=d+2c$.

* * * * *